Nov. 18, 1941.   R. S. SMITH   2,263,145
FLUID FLOW MECHANISM
Filed Nov. 26, 1937   6 Sheets-Sheet 2

Inventor
Reuben Stanley Smith

Attorney.

Nov. 18, 1941.  R. S. SMITH  2,263,145
FLUID FLOW MECHANISM
Filed Nov. 26, 1937  6 Sheets-Sheet 3

Inventor
Reuben Stanley Smith.

Attorney

Nov. 18, 1941.  R. S. SMITH  2,263,145
FLUID FLOW MECHANISM
Filed Nov. 26, 1937  6 Sheets-Sheet 4

Inventor
Reuben Stanley Smith.

Attorney.

Nov. 18, 1941.  R. S. SMITH  2,263,145
FLUID FLOW MECHANISM
Filed Nov. 26, 1937  6 Sheets—Sheet 5

Inventor
Reuben Stanley Smith.

Attorney.

Nov. 18, 1941.    R. S. SMITH    2,263,145
FLUID FLOW MECHANISM
Filed Nov. 26, 1937    6 Sheets—Sheet 6

Inventor
Reuben Stanley Smith.

Attorney.

Patented Nov. 18, 1941

2,263,145

UNITED STATES PATENT OFFICE 2,263,145

FLUID FLOW MECHANISM

Reuben Stanley Smith, Altadena, Calif., assignor to Smith Meter Company, a corporation of California Application November 26, 1937, Serial No. 176,573

14 Claims. (Cl. 73—259)

This invention relates generally to fluid flow mechanisms for use in measuring the volumetric flow of liquids, and is more particularly concerned with metering devices of the rotary type.

It is the general object of the invention to provide a meter which operates with great accuracy, whether used for relatively heavy and stable liquids or for highly volatile liquids such as gasoline.

The meter is of the general type fully described in my copending application, Serial No. 748,342—Fluid flow mechanism, filed October 15, 1934, wherein the general features and many advantages are quite fully explained. It will be unnecessary to repeat them here. However, in the invention of the instant application, there are embodied a number of features giving advantage over the structures illustrated in said copending application.

For instance, in said copending application the inlet and outlet ports are arranged in the peripheral wall of the meter housing or casing. This porting of the wall naturally weakens it to a considerable extent and renders it subject to casting and pressure distortions, thus calling for special reinforcing expedients which add to the weight and complexity of the housing casting.

In contra-distinction to this, I here arrange the inlet and outlet ports in the base and cover, respectively, of the housing, leaving the annular wall entirely unported and therefore with its strength undiminished. The flow of the liquid from base-port to the flow channel and from the flow channel to cover port, is spiraled, a single spiral partition serving to separate the ports. Accordingly, the two ports would, if vertically projected, overlap one another, and thus, together, they require the minimum of angularly-measured space.

The top and bottom porting has other advantages; for instance, it allows for the provision of a strainer or filter in the base casting and a short-coupled faucet attachment for the outlet port of the cover—thus compacting the assembly to an extent which enables it to be fitted within the cramped quarters which are so often allotted to devices of this type; and it allows the floating off of relatively light foreign matter which may find its way into the meter in spite of the screen—while it adapts itself to the provision in the base of means whereby heavier foreign matter may be disposed of expeditiously.

The strainer is readily accessible for cleaning and is so made up that while it will allow free passage of liquid, it effectively traps most foreign matter without "linting up."

Other objects and features of novelty will be made apparent in the following detailed description.

The meter, proper, is indicated generally at 10, while the air-eliminator and flow control is indicated at 11, but I will first describe the meter, proper, and its operation without reference to the eliminator.

The meter housing is generally indicated at 12 and includes an annular body member or barrel 13 and end-closures or cover and base 14 and 15, respectively. Barrel or annulus 13 is flanged at 16 and 17, the flanges being bolted at 18 and 19 to cover flange 20 and base flange 21, respectively. The annulus flanges are recessed at 22 to take compressible gaskets 23.

It is important that the opposed faces 24 and 25 of closures 14 and 15 be maintained in accurate, vertically spaced relation, and of course, the joints between barrel and closures must be fluid-tight. Accordingly, the several flanges are, throughout the major portions of their overlapping extent, firmly held in metal-to-metal contact to preserve this accurate spacing, while gaskets 23 are sufficiently compressible to allow this condition to prevail and yet provide a fluid-tight joint. Grooves 26 in the annulus flanges provide clearances to accommodate any excess packing which may be squeezed out from grooves 22.

Figure 7:
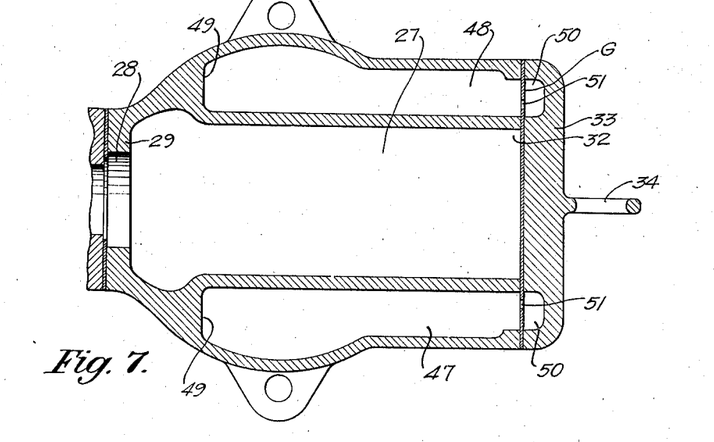
Fig. 7 is a section on line 7—7 of Fig. 6.
Figure 7A:
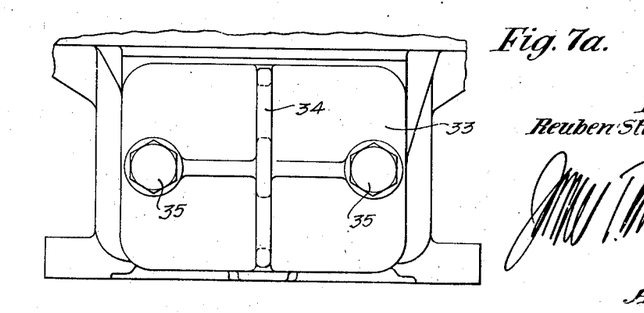
Fig. 7a is an end elevation of Fig. 7.

Base 15 has a diametrically-extending through-passageway or screen chamber 27, the inlet end 28 thereof having an internal, annular flange 29 to receive and center ferrule 30 of strainer or screen-assembly 31. Inlet 28 serves as the inlet to the meter, proper. This assembly is bodily withdrawable from and insertible in chamber 27 through open end 32. It includes a rectangular end cap 33 with hand-hold 34, which is adapted to be detachably held to base 15 by bolts 35 (Fig. 7a) for closing the otherwise open end of the screen chamber, a gasket G being interposed between the cap and the opposed face of the base-casting. A cylindrical screen 36, made up of an inner sleeve 37 of relatively fine-mesh wire and outer sleeve 38 of relatively coarse-mesh wire, is soldered at its opposite ends to ferrule 30 and disk 39, while it is centrally soldered to spider 40. Screw 41 extends through the spider and disk into cap 33, holding the strainer elements in assembly with end-cap 34, gasket G preferably being held clamped by screw 41 between the inner face of the cap and the ends of the strainer sleeves and disk 39.

Fluid entering the ferrule-end of strainer 31, is filtered or screened as it passes radially outward through sleeves 37 and 38 into the annular space 42 thereabout. It will be seen that the entire strainer assembly may be bodily removed for cleaning by merely removing bolts 35 and pulling on hand-hold 34.

Opening upwardly from space 42 is inlet passageway 43 (Figs. 1 and 4), the defining walls 44 and 45 giving this passageway an outward flare. The passageway terminates in inlet port 46 which is arcuately elongated, as viewed in Figs. 3 and 5, and opens to flow channel F.

Figure 6:
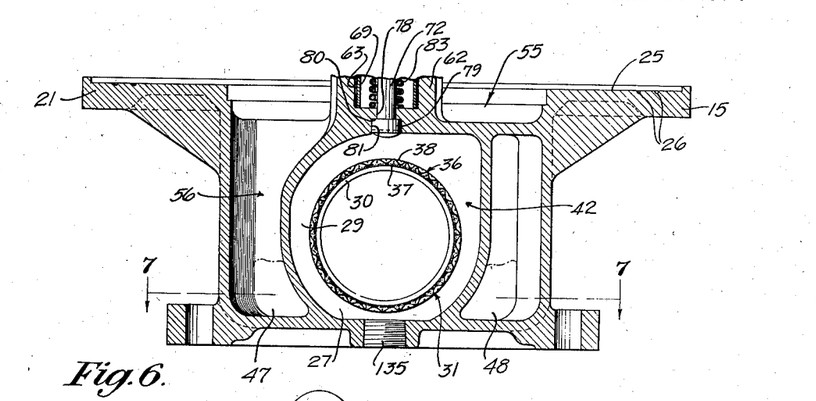
Fig. 6 is a section on line 6—6 of Fig. 5.

Extending parallel to screen chamber 27 but at opposite sides thereof are two sump cavities 47 and 48 (Figs. 4, 6 and 7), these cavities terminating short of one end of the base-casting as at 49. The outer ends of the cavities are closed by cap 33, though if desired, they may register with recesses 50 in that end-cap, gasket G being perforated at 51 to put the recesses and cavities into communication.

A sump passageway 52 extends from port 53 in base-face 25 to cavity 48, so relatively heavy foreign matter within the flow chamber F (which will later be more particularly defined but which, at this time, may be said to be defined at its bottom by face 25) may be swept into port 53 by the action of the rotor-blades (later to be designated) whence they fall through passage 52 into collection or settling cavity 48.

It will be seen that the portion of the base casting at 54 forms a partition between ports 46 and 53.

The top of the base-casting is centrally depressed at 55 (Figs. 1, 5 and 6) below the annular face 25. Leading from this depression to cavity 47 is passageway 56, whereby relatively heavy foreign matter dropping into the depression from the rotor above, may be washed into passageway 56 and thence drop into settling or collection cavity 47.

It will be seen that when end cap 33 is removed, the foreign matter collected within cavities 47 and 48 may be quickly and easily flushed out.

Cover casting 14 has provided in its face 24 an arcuately-elongated outlet port 58 which opens through outlet passageway 59 into chamber 60 of integral valve or faucet housing 61 (Figs. 1 and 4), wall 59' of passageway 59 flaring away from the opposite wall 59''. It will be seen that ports 46 and 58 have portions which, viewed in plan, overlap one another (the barrier separating the ports will be later described) thus giving the benefit of relatively long ports without appreciably reducing the useful angular extent of the flow passage.

Rising from the center of depression 55 is hub or post 62 having a vertically extending bore 63, a uniformly accelerated motion cam 64 being fixed at 65 to an elevated portion 66 of the post at one side of bore 63. Cam 64 has an over-size opening 67 to take vertical cam shaft 68, but it overlies the bore sufficiently to serve as a detachable keeper for retaining certain underlying bearing-parts (to be described later) when the shaft is not in place.

Press-fitted within bore 63 is a rust-proof bushing 69 within which a thimble or block 70 is mounted for vertical, adjustable sliding movement. Slide block 70 is cylindrical, having an end-wall 71 taking adjustment screw 72, and a sleeve portion 73. Keyway 74, milled in the side of the thimble, takes key-pin 75 carried by hub 62, the slide block thus being keyed against rotational movement. Hole 76 in the sleeve-wall, communicates with hub-passageway 77 in the various positions of vertical adjustment of the slide block, this provision allowing foreign matter within the sleeve-bore to be flushed into depression 55, whence it is disposed of as previously described.

Adjustment screw 72 extends through the unthreaded base-bore 78, its head 79 engaging shoulder 80 at the end of counter-bore 81 to limit the upward movement of slide block 70 as urged by compression spring 83. Preferably, the end of block 70 is split as at 84 after the tapping operation, and the free portion 85 is then distorted axially so that when screw 72 is inserted, the springiness of said portion has the effect of a lock-washer which will not positively prevent relative movement of block and screw but will impose enough resistance thereto to hold the block in adjusted position against the loosening effects of vibration and the like.

Block 70 supports radial bearing 86 and thrust bearing 87, both being of the anti-friction type and carrying and taking pin 88 which is press-fitted in bore 89 of shaft 68, and thus, in effect, is a part of that shaft.

This shaft 68 may be considered a part of the rotor assembly generally indicated at R and provides means for supporting that assembly in proper relationship to the meter housing. The upper end of the shaft is bored at 90' to take the press-fitted, elongated hub 90 of pinion 91. Press-fitted in the bore 92 of the pinion is a pin 93 which has bearing within a bushing 94, the latter being press-fitted into the bore 95 of cover casting 14, the pin being slidable vertically within the bearing bushing to accommodate vertical adjusting movement of the shaft. Due to the fact that bearing assemblies 86 and 87 are about mid-way of the vertical length of rotor assembly R, they are capable of taking the greater part of any radial bearing force, and therefore it is unessential that the upper bearing bushing 94 be of the anti-friction type.

The pinion 91 meshes with gear 96 carried on shaft 97 which extends vertically through cover 14 to compartment 98. Shaft 97 is packed-off by the packing assembly indicated generally at 99, the details of which need not be entered into here. The upper end of the shaft carries a gear 100 which, through gear train generally designated at 101, drives pinion 102 on counter-shaft 103. This counter-shaft is adapted to actuate the counter or register mechanism generally indicated at 104, which makes up no part of the present invention.

As has been said, shaft 68 makes up part of the rotor assembly or unit R. The assembly is further made up of an annular body member or carrier 105 having a web 106 extending across the top thereof, the web being ribbed at 106a and supporting a hub 107 within the bore 108, of which, is press-fitted shaft 68, it following that rotation of body 105 acts, through shaft 68 and the gear train previously described, to actuate counter 104.

An in-turned annular flange 109 (Fig. 11) is provided at the lower end of body 105, while the annular wall 110 has four radial slots 111, equally spaced apart and extending from top to bottom of the annulus. Flange 109 and web 106 have slots 112 and 113, respectively, each of which register with the opposite ends of slots 111, though slots 112 and 113 may be wider than slots 111 to provide for greater blade clearance at these points.

There are provided two blade units indicated generally at 114 and 115, each unit embodying a pair of blades 116 connected by yoke 117 (Fig. 9—wherein the blade unit is inverted, top for bottom), the lower ends of the blades being extending inwardly or toward each other as at 116'. The two blade units are individually fashioned so the yokes 117 thereof are spaced apart vertically, as clearly shown in Fig. 1, but both yokes encircle shaft 68 as clearly shown in Fig. 3. Each blade unit supports, by pins 118, a pair of diametrically opposite cam rollers 119, the rollers being confined by their press-fitted bushings 120 within the slots 121. The rollers of both blade units are adapted to engage cam 64, as illustrated. Blade unit 115 differs from the showing of Fig. 9 only in that its yoke is most distantly spaced from ends 116' and the yoke arms are spread sufficiently at 115' to accommodate the downward extension of hub 107.

Applied to annular shoulder 124 on the underside of flange 109 is a ring 125, attachment between flange and ring being made by screws 126. It will be noted shoulder 124 is slightly below the under-surface 123 of flange 109. The ring thus underlies a portion of the extent of each slot 112, and screws 126 plus pins 127 (the latter extending through ring and flange) are arranged at opposite sides of the annulus and flange slots, serving to hold the slotted end of the annulus from spreading and thus definitely and permanently establishing the widths of said slots so that predetermined clearances between the slot-walls and blades 116 are exactly maintained.

Blades 116 slide through slots 111, 112 and 113, and are supported for shuttling movement by hardened polished steel blocks 128 (Figs. 10 and 11) which are held to the under-surface 123 of flange 109 and in a position to bridge slots 112 by clamps 129, the latter being held to ring 125 by screws 126 and having angular lugs 130 engaging the bottoms of sockets 131. These blocks maintain the lower edges of blades 116 in exact horizontal alignment with the under-surface 123 of flange 109 and in spaced relation to the upper surface of ring 125. Adjustment screw 72 is adjusted so that the common horizontal plane of the undersurface 123 of the flange and the bottoms of the blades lies spaced slightly above housing face 25, so that slight clearance L is maintained between the faces in that plane and the face 25. This clearance L, as well as other clearances, are shown of exaggerated extent in the drawings, but actually represent only a few thousandths of an inch.

Spring 83 maintains the rotor body in a position of elevation to preserve this clearance, while the head 79 of screw 72 in its engagement with shoulder 80 limits the upward movement of the rotor and preserves the clearance M between face 24 of cover 14, on the one hand, and the upper edges of the blades and the upper edge of annulus 105 on the other hand, said edges being flush. The clearance M is substantially equal in extent of that of clearance L.

Screw 79 is reached for adjustment by removing the strainer assembly 31 and housing plug 135, whereupon a screw driver may be inserted through the plug-hole and into engagement with the screw.

It will be noted that the entire rotor unit R is resiliently supported on spring 83, so in case of sudden downward jar, the spring serves to absorb the initial shock and the bearings 86 and 87 are relieved therefrom. If the shock be severe, the rotor may momentarily contact face 25, but even should this happen, the shock is taken evenly over the entire under-face of the rotor—the possible load transmitted to the bearings being at all times limited to the spring pressure which is well within their capacity to withstand.

Figure 3:
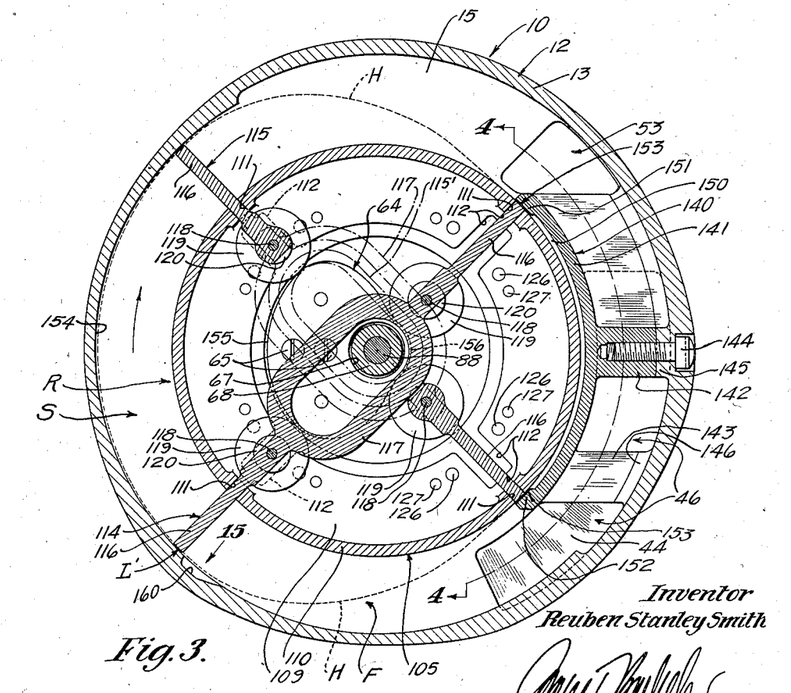
Fig. 3 is a section on line 3—3 of Fig. 1, but showing the rotor as having been rotated to bring the blades into different positions.

Now referring to Fig. 3, it will be noted that the annular flow channel F is defined by the inner wall of casing 13 and the periphery of rotor-annulus 110. Opening to this channel are inlet port 46 and outlet port 58, the flow through channel F being in a clockwise direction, as viewed in this figure.

Interposed in flow channel F and, in effect, between ports 46 and 58, is provided a barrier block 140 (Figs. 1, 3, 4 and 8), which may broadly be considered a part of casing barrel 13. It consists of an arcuate plate portion 141 held in annularly spaced relation to casing 13 by partition 142 and "stream-lined" lugs 143, attachment to the casing being made by bolt 144. Preferably, the machined casing-surfaces against which partition 142 and lugs are drawn by bolt 144, are provided on projections 145 and 146, respectively, which extend integrally and inwardly from casing 13.

Partition 142 may be considered as a rib on plate-portion 141 and extending diagonally or spirally from bottom to top of flow channel F, for it rests on portion 54 of base-face 25 and extends to cover face 24 at a point vertically offset from portion 54.

Figures 4, 8, 9:
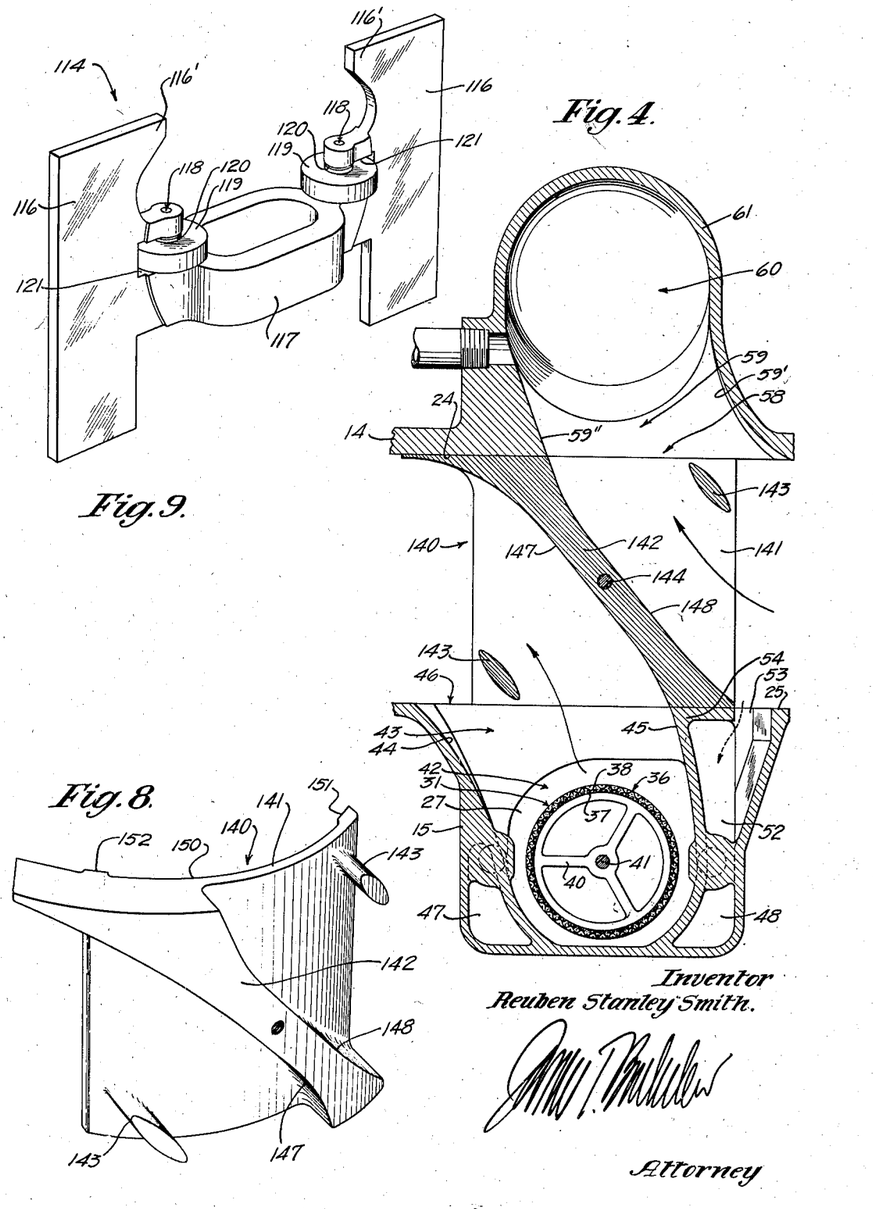
Fig. 4 is a fragmentary section on line 4—4 of Fig. 3.
Fig. 8 is a perspective of the abutment block.
Fig. 9 is an inverted perspective of one of the rotor blade-units.
Figures 5, 10, 11, 15:
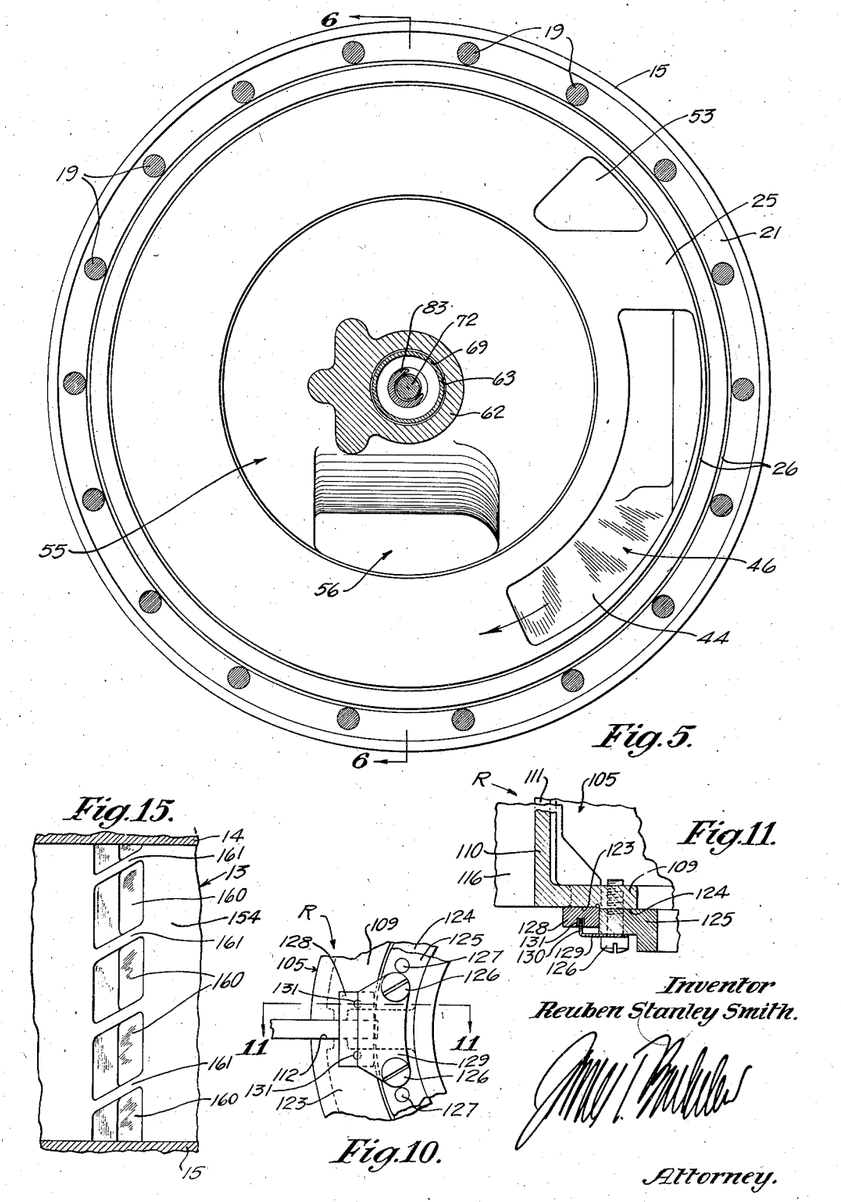
Fig. 5 is a section on line 5—5 of Fig. 1.
Fig. 10 is a fragmentary bottom plan view of Fig. 1 as viewed from the position of line 10—10 of that figure.
Fig. 11 is a section on line 11—11 of Fig. 10.
Fig. 15 is a fragmentary elevation of the interior of the housing wall as viewed from the position of arrow 15 in Fig. 3.

The lower end of partition wall 147 registers with one end of inlet port 46 and then curves in a relatively wide sweep toward face 24. The upper end of the opposite partition wall 148 extends from one end of port 53 and then curves in a relatively wide sweep to one end of port 58. These walls, in their association with walls 46 and 59', define easy, smoothly curving passageways which contribute to the even and uninterrupted flow of liquid through the meter. It will be seen that the liquid, in passing from chamber 42 to the flow channel and from the flow channel to outlet chamber 60, may be considered as following a spiral path. It will be seen that the center of outlet chamber 60 is in vertical alignment with inlet chamber 27 (Fig. 4).

The outer face of plate-portion 141 of block 140, is recessed from top to bottom to provide a clearance passageway 150 between the rotor and block. This recession leaves vertically extending lugs 151 and 152 near the ends of the block, which lugs are spaced apart slightly less than 90° and establish diminished clearance passageways 153, which, taken together with passageway 150, may be considered a "return" or corrective passageway, the significance of which is fully pointed out in said copending application.

Diametrically opposite block 140, the inside of housing wall 13 is accurately machined at 154 throughout an angular extent of at least more than 90°, this portion of the wall and the opposite wall of the rotor annulus defining the sides of measuring chamber S which is, of course, a part of flow channel F. The measuring chamber is defined at top and bottom by faces 24 and 25 and at its ends by any two adjacent rotor blades when both are within the limits of face 154. The dimensions of the measuring chamber are such that its volumetric capacity will have a known value to which counter 104 may be accommodated to register in any chosen unit of measure.

Cam 64 is so located that, upon rotation of the rotor, a given blade is projected to its farthest extent just before it reaches the measuring chamber, the opposite blade of that unit simultaneously reaching its position of full retraction (preferably a little below the peripheral face of the rotor to insure ample clearance with respect to block-lugs 151, 152) just prior to reaching lug 151. The cam rollers 118 of that unit then ride over dwells 155 and 156 which maintain the blades in their respective positions of full projection and retraction until just after they leave the measuring chamber and lug 152, respectively. The path of a given blade during one revolution of the rotor is indicated in dotted lines H in Fig. 3.

As the fluid flows through inlet 46, it is guided by the smoothly curving walls of the inlet passageway into flow channel F. In its passage through the flow channel, the fluid acts against such rotor blades as are in its path in a manner to cause rotor rotation which, in turn, shuttles the blades in the manner described. The fluid then is guided by the smoothly curving walls of the outlet passageway and is finally delivered through the faucet-valve, to be described.

The mounting and association of the various parts of the rotor render it capable of smooth and easy rotation under the slightest of impulses. Accordingly, but little resistance is offered to the flow of fluid through the meter and, since the blades are being bodily carried in the direction of fluid-flow and at practically the same velocity thereas, said blades do not, by virtue of radial movement through the fluid-stream to the projecting positions, appreciably retard the passages of the fluid from the inlet to the measuring chamber.

Centrifugal force tends to hold each blade successively outward as it is extended beyond its central position, thus holding an associated cam roller firmly in contact with the small-radius dwell 156 during movement of the cam blade through the measuring chamber. This insures that the blade will normally clear measuring chamber wall 154 by a predetermined extent, as at L' (Fig. 1), eliminating frictional drag and insuring predetermined slippage past the blades, all of which contributes to the securement of accurate metering results, as more particularly pointed out in said co-pending application.

In spite of strainer 31, extraneous matter may find its way into the flow channel and, of course, there may be present metal chips or core-sand remaining within the meter after assembly, or there may be metal particles which become detached during meter operation. It has been said before that the lighter particles are floated out through chamber 60, while the heavier particles within the flow channel drop to the bottom and are swept by the fluid ahead of the blades to port 53, where they drop to sump cavity 48. It will be noted that port 53 extends substantially across the full width of the flow channel and is located at a point beyond the shuttling range of the rotor blades (see Fig. 3, where the dotted line H indicates said range). Likewise it will be seen the heavier particles within the rotor unit drop to depression 55, whence they finally pass through passageway 56 into sump-cavity 47.

In order to rid the vertical edges of the blades of sand or other foreign matter which may have a tendency to cling thereto, I provide a vertical series of recesses 160 (Figs. 3 and 15) in the inner wall of casing 13 at the point where the blades first reach their position of full extension. The recesses are vertically defined by diagonal ribs 161, and it is found that the resulting diagonal or spiral formation of the recesses gives the fluid a sweeping effect over the edges of the blades which effectively dislodges extraneous matter therefrom. It will be seen that the positioning of the recesses insures that the extraneous matter is cleared away before it can be trapped between the blade-edges and the machined casing-wall of the measuring chamber, and thus scoring and drag are prevented. In the event such wear develops in the cam rollers or their mountings as to allow blades 116 to be moved by centrifugal force into contact with wall 154, the slight blow of the initial impact is taken on the spaced ribs 161, and the extraneous matter on the blade-edges between ribs is projected into the recesses where it is washed away by the fluid spiraling therethrough, instead of being driven against or into the casing-wall.

Figure 1:
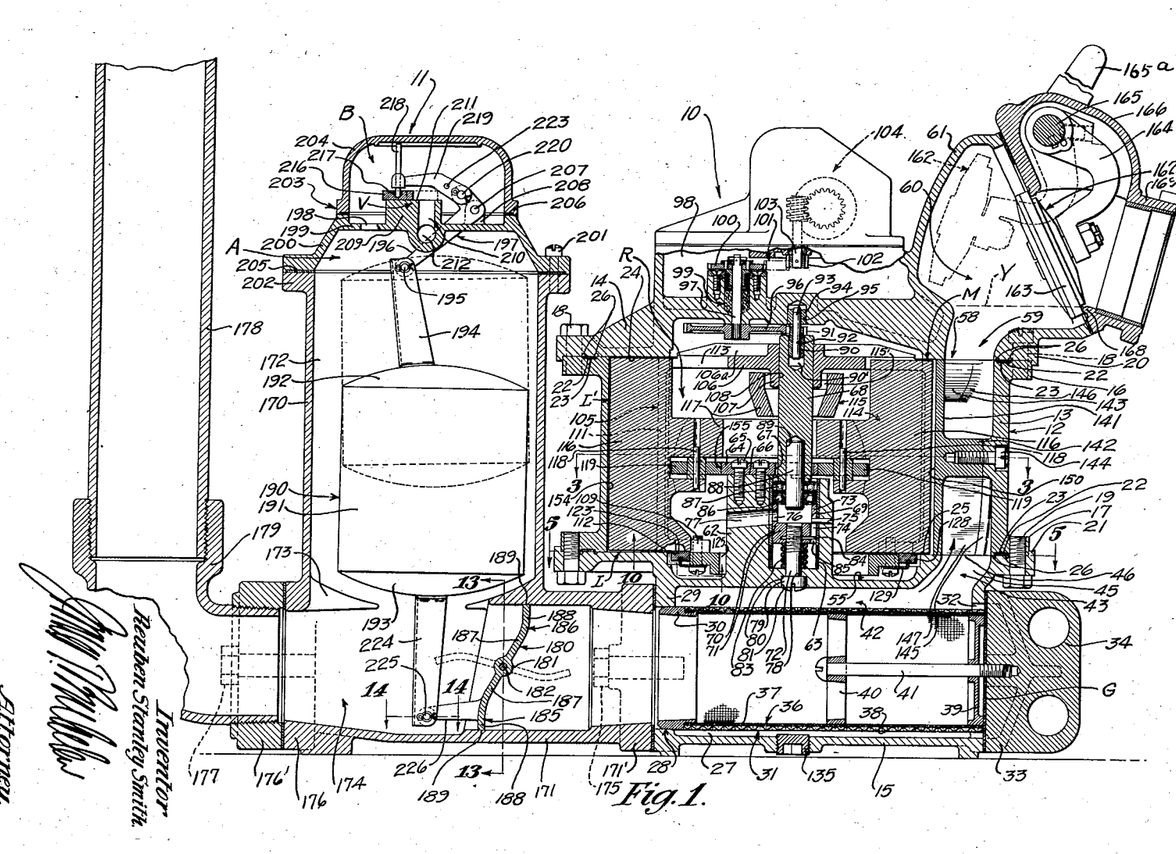
Fig. 1 is a medial sectional view taken through a device embodying my invention, the section through the cap of the air eliminator being taken on the line 1—1 of Fig. 12.
Figure 2:
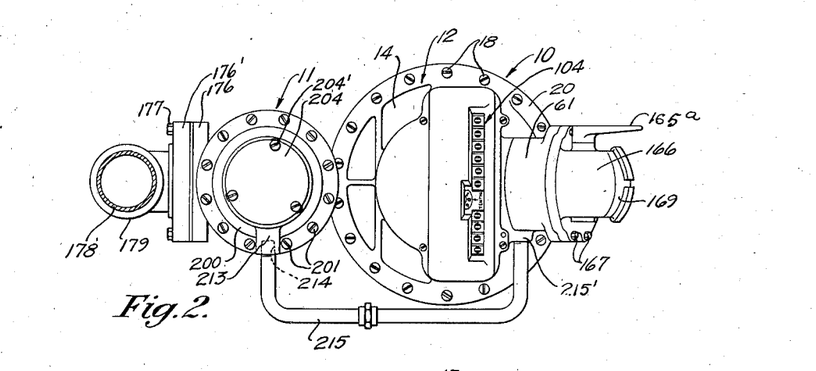
Fig. 2 is a reduced-scale plan view of Fig. 1.

I have indicated generally at 162 a valve or faucet for controlling the outlet of the meter. The details of the valve are set forth in my copending application entitled Fluid meter and faucet valve therefor, filed January 19, 1938, Serial No. 185,682; but it will suffice for present purposes to state that it includes a disk-stopper 163 carried on an arm 164 extended from rock shaft 165. Shaft 165 is journalled in housing 166, the latter being applied to housing 61 by bolts 167 (Fig. 2). In closed condition, disk 163 engages seat 168, while rotation of shaft 165 is effective to move disk 163 to the open position indicated in dotted lines. Housing 166 has an outlet neck 169 to which attachment of the delivery pipe or the line (not shown) is made. Stopper 163 is operated to and from closed position by handle 165a on shaft 165 (Figs. 1 and 2).

The air eliminator and flow regulator 11 includes a cylindrical barrel or casing 170 extending vertically from the integral and horizontally extending casing or pipe 171, the bore of float-chamber 172 of casing 170 opening at 173 to horizontal bore 174. One end of pipe 171 has an attachment flange 171' applied by bolts 175 to flange 29 at the side of meter base 15, whereby eliminator bore 174 is put into communication with meter-inlet 28. The opposite end of pipe 171 has a fitting 176' applied to its attachment flange 176 by bolts 177, the inlet or stand-pipe 178 being secured to fitting 176' by elbow 179.

Figures 12, 13, 14:
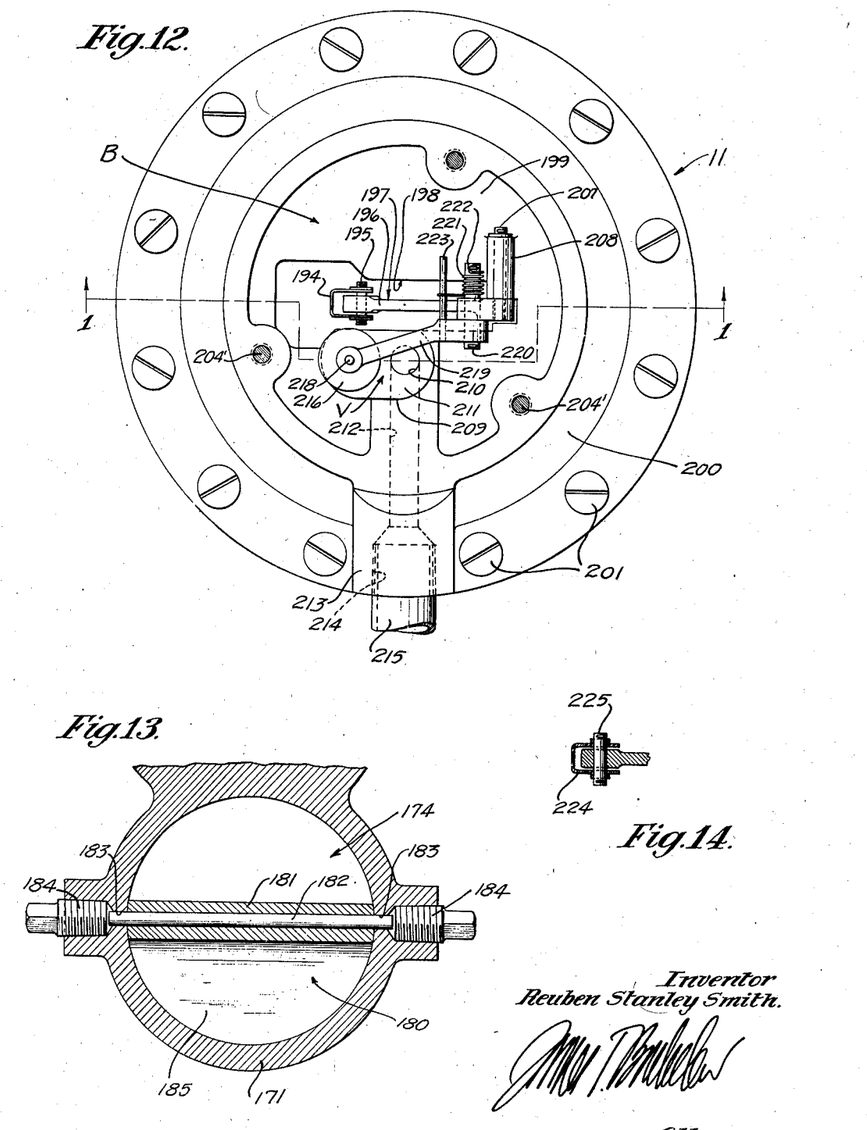
Fig. 12 is a plan view of the air eliminator with the head-cap removed.
Fig. 13 is a section on line 13—13 of Fig. 1.
Fig. 14 is a fragmentary section on line 14—14 of Fig. 1.

Within pipe bore 174 at the right (Fig. 1) of float-chamber opening 173, is a flow-control valve 180 (Fig. 13). This valve, of the butterfly type, is circular, as viewed axially of the pipe, and is of a diameter to fit bore 174. It includes a horizontal hub 181 taking shaft 182 whereby the valve is mounted for oscillatory movement to and from closed position. Shaft 182 has bearing in bores 183 in the pipe-wall, while plugs 184 hold the shaft against end-wise displacement, one, at least, of the plugs being removed to allow assembly or disassembly of the valve and its shaft within bore 174.

Disk 180 may be considered as made up of two blades 185 and 186, said blades lying at opposite sides of the vertical axial plane of shaft 182. In closed position each blade has a diagonally extending inner portion 187, while the outer portion 188 extends substantially vertically, the square-cut-ends 189 of the blades engaging pipe 171 as a positive stop to prevent counter-clockwise movement from the full-line position of Fig. 1 and thus establishing the closed position of the valve.

By reason of this offset arrangement of the valve blades, I overcome the depression effect usual to most valves of this type, which acts (as such valves are initially opened and by reason of the rapid fluid-flow past the end of one of the angularly disposed blades) in a manner tending to reclose the valve and thus materially to interfere with the nice balance necessary to successful operation of a float-operated butterfly valve throughout its various positions of adjustment.

Adapted to reciprocate vertically within float chamber 172 is a float 190 here shown as made up of a cylindric metal shell 191 whose ends are closed at 192 and 193. From top 192 extends a vertical leg 194 of channel cross-section (Fig. 12) which is pivotally connected at 195 to arm 196 of bell crank 197. Crank 197 extends through a slot 198 in plate 199 which is an integral part of cap 200. Cap 200 is bolted at 201 to flange 202 of casing 170, and may be considered as making up a portion of the top closure or head generally indicated at 203. Head 203 is completed by cap 204, secured to cap 200 by bolts 204' (Fig. 2). Gaskets 205 and 206 are interposed between cap 200 and casing 170 at one side and caps 200 and 204, at the other side.

Bell crank 197 is pivotally supported by a pin 207 (Fig. 12) supported from plate 199 by boss 208. Also extending from plate 199 is an elongated boss 209 which has a vertical bore 210 extending from its upper machined face 211 to horizontal bore 212 which extends horizontally to boss 213 at the outer edge of the cap and which provides a threaded socket 214 for the reception of by-pass pipe 215.

Sliding on face 211 of boss 209, is a slide valve 216, which may be conveniently made up of a disk of such material as "Catalan." Disk 216 has a central socket 217 adapted to take the lower end of pin 218 which is carried by arm 219 pivotally connected at 220 to crank 197. Pivot pin 220 is extended to receive a coiled torsion spring 221, the looped extremities of which engage cotter key 222 carried by the pivot pin, and transverse pin 223 carried by arm 219, respectively. The effect of this spring is to tend to rotate arm 219 in a counter-clockwise direction (as viewed in Fig. 1) so as always to pressurally engage disk 216 with face 211, said face and disk being lapped to insure full-area contact. Spring 221 thus acts to hold disk 216 flat against face 211 irrespective of the bodily left or right sliding movement imposed on that disk by virtue of bell crank movement, the fit between pin 218 and socket 217 being sufficiently free to allow the slight rocking movement of the pin during such bell crank movement. The disk is also capable of rotation about the pin—thus giving it self-cleaning and self-lapping characteristics.

The upper end of pin 218 is extended into close proximity with the underface of cover 204, to prevent, during shipment or rough handling, a sufficient extent of clockwise movement of arm 219 as to accidentally dislodge pin 218 from socket 217.

It will appear that when float 190 rises from the full line of Fig. 1 to the dotted line position, bell crank 197 will be rotated clockwise, thereby bodily drawing arm 219 and disk 216 to the right and causing said disk to close off passageway 210.

Extending downwardly from float 190 is leg 224 of channel cross-section (Fig. 14) which is pivotally connected at 225 to crank arm 226 extending from and integral with valve 180. It will be seen that downward movement of the float is limited to the extent shown in Fig. 1 by reason of the contact of valve edge 189 with pipe 171. Likewise, it will be seen that the float is supported solely by its connection with valve arm 226 and with bell crank 196, there thus being no necessity for providing guides, or the like, common to most float valves, which are very likely to stick or bind the floats. Of course, in its vertical travel, the float will have a component of horizontal bodily movement but this is in no way disadvantageous since ample annular clearance is left between the float and the wall of the float chamber 172.

In the normal condition of the entire system and with faucet valve 162 closed, the meter will be completely filled with fluid and the fluid in chamber 170 will hold float 190 in its uppermost position (dotted lines in Fig. 1) wherein the air-outlet valve generally indicated at V, made up of boss 209 and disk 216, is closed, and regulator valve 180 is in the open position indicated by dotted line. Air will be trapped in the air chamber A above the fluid in chamber 172, as well as in the valve chamber B.

In this condition, valve 180 offers no appreciable resistance to the flow of fluid through bore 174 and thence through the meter to outlet 169 when faucet 162 is opened. However, should there be air entrained in the incoming fluid, it will naturally seek to rise therethrough and, upon reaching a point below the float chamber will pass upwardly through the float chamber liquid and into air chamber A, thus being prevented from passing through the meter and causing a false reading to be given by counter 104.

As the air gathers within chamber A, it downwardly displaces the fluid within the float chamber and raises the air pressure within that chamber. This displacement of fluid causes the float to drop, thus shifting valve-disk 216 toward the left in Fig. 1. As the float drops, it tends to move valve 180 toward closed position and the valve, in its partly closed position, acts as a baffle to more definitely direct the fluid with its entrained air into the float chamber, to give that air a better and longer opportunity to rise to chamber A.

When the air within the chamber has gathered to an extent sufficient to drop the float to a position where air-valve V is opened, the air, under its built-up pressure, will flow through passageway 210 and 212 into by-pass tube 215, and by this action chamber A will be drained of air sufficiently to allow fluid again to rise in the float chamber until valve V is again closed. So long as the incoming fluid contains entrained air, these intermittent air-releases will occur.

Broadly, by-pass pipe 215 may run to any point of delivery, but since it usually contains explosive vapors, it is preferred that it be led back into the line at a point beyond the measuring chamber of the meter. Accordingly, I have here shown pipe 215 as being tapped back into faucet-chamber 60 at 215'. This particular manner of by-passing the air has a further advantage, for when the control valve 180 is in partly closed position, the rush of fluid through neck 169 will tend to create depression about the outlet of the by-pass and thus aid in quickly and suddenly emptying chambers A and B of the excess air.

It will be noted that the elevation of outlet port 169 with reference to the flow channel F of the meter is such that when the fluid supply to which pipe 178 is connected becomes exhausted so that the level of such inlet fluid is depressed to a point substantially level to the outlet 169, as indicated by the dotted line Y, flow will cease but the meter flow channel will have a sufficient volume of fluid trapped below this level to remain completely filled and thus exclude air from the meter channels and prevent drainage of the rotor chamber or other meter channels.

When the supply tank is refilled and additional fluid passes into the eliminator, the meter operation is resumed without inaccuracies of measurement which might exist if air had been admitted to the meter channels.

While I have shown and described a preferred embodiment of my invention, it will be understood that various changes in design, structure and arrangement may be made without departing from the spirit and scope of the appended claims.

I claim:

1. In a fluid flow mechanism, a casing embodying a vertically arranged barrel having a cylindrical bore and top and bottom covers fixed thereto, a rotor body concentrically mounted in the barrel bore for rotation therein, the rotor being annularly spaced from the barrel wall, a barrier fixed to the barrel and disposed in the annular space defined by the barrel and rotor body, the space extending continuously from end to end of the barrier comprising the flow channel and said covers defining the top and bottom of the flow channel, rotor blades mounted for shuttle movement transversely of the flow channel and for radial retraction as they individually pass said barrier during rotor-rotation, there being an inlet in said bottom cover opening to the channel at one side of the barrier, and there being an outlet in said top cover opening from the channel at the other side of the barrier, said inlet and outlet being substantially in vertical alinement.

2. In a fluid flow mechanism, a casing embodying a vertically arranged barrel having a cylindrical bore and top and bottom covers fixed thereto, a rotor body concentrically mounted in the barrel bore for rotation therein, the rotor being annularly spaced from the barrel wall, a barrier fixed to the barrel and disposed in the annular space defined by the barrel and rotor body, the space extending continuously from end to end of the barrier comprising the flow channel and said covers defining the top and bottom of the flow channel, said barrier extending diagonally between covers, rotor blades mounted for shuttle movement transversely of the flow channel and for radial retraction as they individually pass said barrier during rotor-rotation, there being an inlet in said bottom cover opening to the channel at one side of the barrier adjacent the lower end thereof, and there being an outlet in said top cover opening from the channel at the other side of the barrier adjacent the upper end thereof, said inlet and outlet being substantially in vertical alinement.

3. In a fluid flow mechanism, a casing embodying a vertically ararnged barrel having a cylindrical bore and top and bottom covers fixed thereto, a rotor body concentrically mounted in the barrel bore for rotation therein, the rotor being annularly spaced from the barrel wall, a barrier fixed to the barrel and disposed in the annular space defined by the barrel and rotor body, the space extending continuously from end to end of the barrier comprising the flow channel and said covers defining the top and bottom of the flow channel, rotor blades mounted for shuttle movement transversely of the flow channel and for radial retraction as they individually pass said barrier during rotor-rotation, there being an inlet port in said bottom cover opening to the flow channel and an outlet port in said top cover opening from said flow channel, said ports being substantially in vertical alinement, said barrier extending diagonally from cover to cover and from a point adjacent one end of the inlet port to a point adjacent the opposite end of the outlet port.

4. In a fluid flow mechanism, a casing embodying a vertically arranged barrel having a cylindrical bore and top and bottom covers fixed thereto, a rotor body concentrically mounted in the barrel bore for rotation therein, the rotor being annularly spaced from the barrel wall, a barrier fixed to the barrel and disposed in the annular space defined by the barrel and rotor body, the space extending continuously from end to end of the barrier comprising the flow channel and said covers defining the top and bottom of the flow channel, rotor blades mounted for shuttle movement transversely of the flow channel and for radial retraction as they individually pass said barrier during rotor-rotation, there being an inlet port in said bottom cover and an outlet opening in said top cover, said ports being substantially in vertical alinement and opening to the flow channel at bottom and top, respectively, thereof; and said barrier embodying an arcuate plate-portion spaced annularly from the barrel wall and a rib extending from cover to cover and from the arcuate portion to the barrel wall, said rib also extending from one end of the inlet port to the opposite end of the outlet port.

5. In a fluid flow mechanism, a casing embodying a vertically arranged barrel and top and bottom covers therefor, a rotor body mounted for rotation about a vertical axis in the barrel bore, said barrel and rotor body defining the sides of a flow channel, rotor blades mounted for shuttle movement transversely of the flow channel, one side of the rotor body being positioned adjacent a portion of the casing to form a barrier defining the ends of the flow channel, there being inlet and outlet ports in the casing at opposite sides of and adjacent the barrier, the outlet port being in communication with the top of the flow channel and there being a settling cavity in the bottom cover and a port in the bottom-defining wall of the flow channel at the outlet end thereof and adjacent the barrier, said last mentioned port opening downwardly to said settling cavity, said port extending substantially across the full width of the flow channel at a point beyond the shuttling range of the blades.

6. In a fluid flow mechanism, a casing embodying a vertically arranged barrel and top and bottom covers therefor, a rotor body mounted for rotation about a vertical axis in the barrel bore, said barrel and rotor body defining the sides of a flow channel, rotor blades mounted for shuttle movement transversely of the flow channel, one side of the rotor body being positioned adjacent a portion of the casing to form a barrier defining the ends of the flow channel, there being inlet and outlet ports in the casing at opposite sides of the barrier, and there being a pair of settling cavities in said bottom cover and a port in the bottom-defining wall of the flow channel at the outlet end thereof, said last mentioned port extending substantially across the full width of the flow channel and opening downwardly to one of the settling cavities, and there being an unrestricted port in said bottom cover opening downwardly from a point beneath the rotor to the other settling cavity, a pair of clean-out openings, one for each cavity, and a common detachable closure for both said clean-out openings.

7. In a fluid flow mechanism, a casing embodying a vertically arranged barrel having a cylindrical bore and top and bottom covers fixed thereto, a rotor body concentrically mounted in the barrel bore for rotation therein, the rotor being annularly spaced from the barrel wall, a barrier fixed to the body and disposed in the annular space defined by the barrel and rotor body, the space extending continuously from end to end of the barrier comprising the flow channel and said covers defining the top and bottom of the flow channel, rotor blades mounted for shuttle movement transversely of the flow channel and for radial retraction as they individually pass said barrier during rotor-rotation, there being an inlet port in said bottom cover and an outlet opening in said top cover, said ports being substantially in vertical alinement and opening to the flow channel at bottom and top, respectively, thereof; and said barrier embodying an arcuate plate-portion spaced annularly from the barrel wall and a rib extending from cover to cover and from the arcuate portion to the barrel wall, said rib also extending diagonally upward from one side of the inlet port in the bottom cover to the opposite side of the outlet port in the top cover, the downwardly presented face of the rib lying vertically above the inlet port and curving smoothly toward the upper cover in the direction of fluid-flow from the inlet port to the flow channel.

8. In a fluid flow mechanism, a casing embodying a vertically arranged barrel having a cylindrical bore and top and bottom covers fixed thereto, a rotor body concentrically mounted in the barrel bore for rotation therein, the rotor being annularly spaced from the barrel wall, a barrier fixed to the body and disposed in the annular space defined by the barrel and rotor body, the space extending continuously from end to end of the barrier comprising the flow channel and said covers defining the top and bottom of the flow channel, rotor blades mounted for shuttle movement transversely of the flow channel and for radial retraction as they individually pass said barrier during rotor-rotation, there being an inlet port in said bottom cover and an outlet opening in said top cover, said ports being substantially in vertical alinement and opening to the flow channel at bottom and top, respectively, thereof; and said barrier embodying an arcuate plate-portion spaced annularly from the barrel wall and a rib extending from cover to cover and from the arcuate portion to the barrel wall, said rib also extending diagonally upward from one side of the inlet port in the bottom cover to the opposite side of the outlet port in the top cover, the downwardly presented face of the rib lying vertically above the inlet port, and the flow channel where it extends horizontally opposite said face being substantially uninterrupted by barrier and casing structure.

9. In a fluid flow mechanism, a casing embodying a vertically arranged barrel having a cylindrical bore and top and bottom covers fixed thereto, a rotor body concentrically mounted in the barrel bore for rotation therein, the rotor being annularly spaced from the barrel wall, a barrier fixed to the body and disposed in the annular space defined by the barrel and rotor body, the space extending continuously from end to end of the barrier comprising the flow channel and said covers defining the top and bottom of the flow channel, rotor blades mounted for shuttle movement transversely of the flow channel and for radial retraction as they individually pass said barrier during rotor-rotation, there being an inlet port in said bottom cover and an outlet opening in said top cover, said ports being substantially in vertical alinement and opening to the flow channel at bottom and top, respectively, thereof; and said barrier embodying an arcuate plate-portion spaced annularly from the barrel wall and a rib extending from cover to cover and from the arcuate portion to the barrel wall, said rib also extending diagonally upward from one side of the inlet port in the bottom cover to the oposite side of the outlet port in the top cover, the downwardly presented face of the rib lying vertically above the inlet port and curving smoothly toward the upper cover in the direction of fluid-flow from the inlet port to the flow channel, and the flow channel where it extends horizontally opposite said face being substantially uninterrupted by barrier and casing structure.

10. In a fluid flow mechanism, a casing embodying a vertically arranged barrel and top and bottom covers therefor, a rotor body mounted for rotation about a vertical axis in the barrel bore, said barrel and rotor body defining the sides of a flow channel, rotor blades mounted for movement transversely of the flow channel, one side of the rotor body being positioned adjacent a portion of the casing to form a barrier defining the ends of the flow channel, there being a horizontally extending inlet passageway in the bottom cover and a port opening from said passageway into the flow channel adjacent one side of the barrier, and there being an outlet passageway through the casing from the flow channel adjacent the other side of the barrier, there being a settling cavity in said bottom cover at one side of the inlet passageway but isolated therefrom, and there being a port in the bottom cover opening from the flow channel downwardly into said settling cavity.

11. In a fluid flow mechanism, a casing embodying a vertically arranged barrel and top and bottom covers therefor, a rotor body mounted for rotation about a vertical axis in the barrel bore, said barrel and rotor body defining the sides of a flow channel, rotor blades mounted for movement transversely of the flow channel, one side of the rotor body being positioned adjacent a portion of the casing to form a barrier defining the ends of the flow channel, there being a horizontally extending inlet passageway in the bottom cover and a port opening from said passageway into the flow channel adjacent one side of the barrier, and there being an outlet passageway through the casing from the flow channel adjacent the other side of the barrier, there being a settling cavity in said bottom cover at one side of the inlet passageway but isolated therefrom, and there being a port in the bottom cover adjacent the other side of the barrier and opening from the flow channel downwardly into said settling cavity.

12. In a fluid flow mechanism, a casing embodying a vertically arranged barrel and top and bottom covers therefor, a rotor body mounted for rotation about a vertical axis in the barrel bore, said barrel and rotor body defining the sides of a flow channel, rotor blades mounted for movement transversely of the flow channel, one side of the rotor body being positioned adjacent a portion of the casing to form a barrier defining the ends of the flow channel, there being a horizontally extending inlet passageway in the bottom cover and a port opening from said passageway into the flow channel adjacent one side of the barrier, and there being an outlet passageway through the casing from the flow channel adjacent the other side of the barrier, there being a settling cavity in said bottom cover at one side of the inlet passageway but isolated therefrom, there being a port in the bottom cover opening from the flow channel downwardly into said settling cavity, there being a second settling cavity in the bottom cover at the other side of said inlet passageway but isolated therefrom, and there being a second port in the bottom cover opening downwardly from a point beneath the rotor to said second cavity.

13. In a fluid flow mechanism, a casing, a rotor body mounted for rotation about a vertical axis within the casing, said casing and rotor body defining the sides of a flow channel, rotor blades carried by the body and mounted for radial shuttle movement transversely of the flow channel, one side of the rotor body being positioned adjacent a portion of the casing to form a barrier defining the ends of the flow channel, means for shuttling said blades, the blades individually initially reaching their position of full radial extension when they are opposed to a point on the casing which is spaced angularly from the barrier at the inlet side of the flow channel, and there being a substantially vertical series of recesses in the casing wall approximately at said point, said recesses defining between them a substantially vertical series of ribs having faces which are substantially flush with the flow-channel defining face of the casing.

14. In a fluid flow mechanism, a casing, a rotor body mounted for rotation about a vertical axis within the casing, said casing and rotor body defining the sides of a flow channel, rotor blades carried by the body and mounted for radial shuttle movement transversely of the flow channel, one side of the rotor body being positioned adjacent a portion of the casing to form a barrier defining the ends of the flow chanel, means for shuttling said blades, the blades individually initially reaching their position of full radial extension when they are opposed to a point on the casing which is spaced angularly from the barrier at the inlet side of the flow channel, and there being a substantially vertical series of diagonal recesses in the casing wall approximately at said point, said recesses defining between them a substantially vertical series of diagonal ribs having faces which are substantially flush with the flow-channel defining face of the casing.

REUBEN STANLEY SMITH.